(12) United States Patent
Gonnerman et al.

(10) Patent No.: US 6,746,175 B1
(45) Date of Patent: Jun. 8, 2004

(54) FENESTRATION CORNER LOCK

(75) Inventors: Michael Gonnerman, Pella, IA (US);
Andrew P. Schirz, Pella, IA (US);
John Scharff, Pella, IA (US)

(73) Assignee: Pella Corporation, Pella, IA (US)

( * ) Notice: Subject to any disclaimer, the term of this patent is extended or adjusted under 35 U.S.C. 154(b) by 0 days.

(21) Appl. No.: 09/412,549

(22) Filed: Oct. 5, 1999

(51) Int. Cl.[7] .................................................. E08B 3/96
(52) U.S. Cl. ........................ 403/403; 403/382; 403/268
(58) Field of Search .............................. 403/401, 402, 403/403, 384, 382, 265, 267, 268, 292, 294, 295; 52/656.9

(56) References Cited

U.S. PATENT DOCUMENTS

| | | | |
|---|---|---|---|
| 3,994,243 A | | 11/1976 | Anders |
| 4,105,352 A | | 8/1978 | Holdiman |
| 4,145,150 A | * | 3/1979 | Rafeld |
| 4,222,209 A | * | 9/1980 | Peterson |
| 4,296,587 A | * | 10/1981 | Berdan |
| 4,336,645 A | | 6/1982 | Bucci |
| 4,455,796 A | | 6/1984 | Schoofs |
| 4,481,701 A | | 11/1984 | Hewitt |
| 4,651,482 A | * | 3/1987 | Borys |
| 4,683,634 A | | 8/1987 | Cole |
| 5,010,708 A | | 4/1991 | Evans et al. |
| 5,028,165 A | | 7/1991 | Schools |
| 5,105,581 A | | 4/1992 | Slocomb, Jr. |
| 5,150,983 A | | 9/1992 | Bogenhagen |
| 5,157,885 A | | 10/1992 | Wertitsch et al. |
| 5,205,102 A | | 4/1993 | Plummer |
| 5,648,036 A | | 7/1997 | Glang et al. |
| 5,735,068 A | | 4/1998 | Houssian |
| 6,047,514 A | * | 4/2000 | Verch |

FOREIGN PATENT DOCUMENTS

FR 2759111 * 6/1997

OTHER PUBLICATIONS

English equivalent of FR–279511.*
Pella Corporation Drawings disclosing products on sale and in public use prior to Oct. 1, 1998: Drawing No. 77E9–1 dated Aug. 23, 1993; Drawing No. 08L8–2 dated Nov. 29, 1995 and Oct. 26, 1996; Drawing No. 080M–1 dated Jun. 25, 1986; Drawing No. 07L8–1 dated Sep. 13, 1990; Drawing No. 1958–1 dated Oct. 1, 1980; Drawing No. 77E9–2 dated Dec. 25, 1995; and Drawing No. 08AB–2 dated Mar. 21, 1995.
Pella Corporation Clad Frames, K.D. Assembly and Glazing Instructions TPR106–495 published prior to Oct. 1, 1998.

* cited by examiner

Primary Examiner—John R. Cottingham
(74) Attorney, Agent, or Firm—Faegre & Benson, LLP

(57) ABSTRACT

A fenestration product such as a door or a window includes a plurality of frame members positioned in a surrounding relationship about a panel, each of the members having a pair of opposite open ends. A plurality of corner locks couple the beveled ends of the frame members together to form secure corners of the frame. A miter joint interface line is defined between the abutting, beveled ends of the members at each corner. Each corner lock comprises a generally L-shaped body having a pair of legs that are secured within the open ends of the corresponding frame members. A pair of parallel sealant channels extend along the back, top and front of the body and are disposed on opposite sides of and laterally offset from the interface line so that sealant filling the channels creates a pair of parallel seal paths between the lock and the frame that are laterally offset from the interface line. This keeps the sealant from escaping through the interface line onto the decorative surface of the frame and creating an unsightly deposit, yet provides a secure seal against the environment. A small notch in the frame at each corner allows a small amount of the sealant to flow out of the corner and onto the non-decorative surface of the frame for covering the interface line on the non-decorative surface.

58 Claims, 5 Drawing Sheets

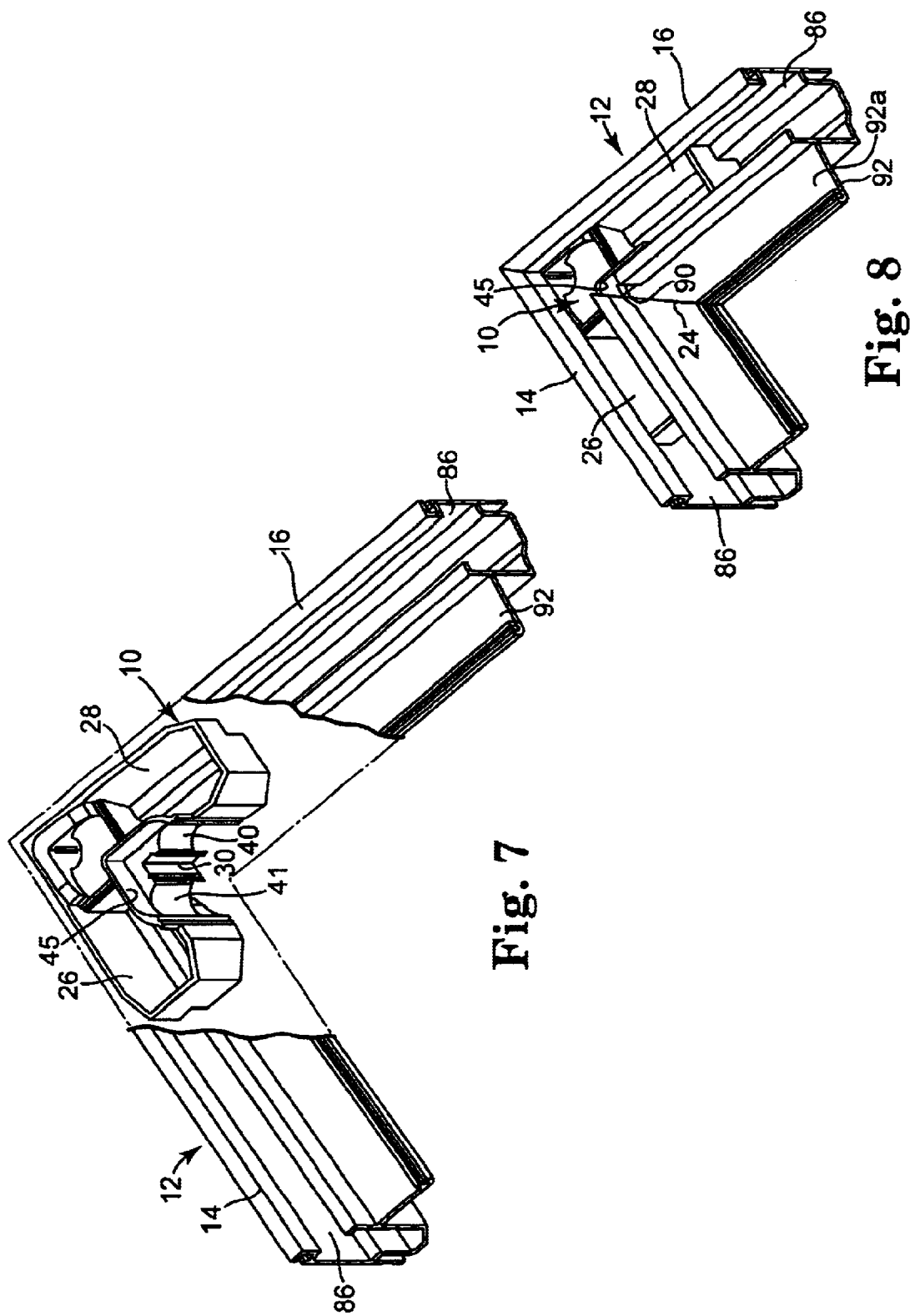

FENESTRATION CORNER LOCK

BACKGROUND OF THE INVENTION

1. Field of the Invention

This invention relates to the field of fenestration products. More particularly, the invention is concerned with locks that join together intersecting members of a metal clad frame to provide a rigid corner that can be injected with sealant to produce an environmental seal along the miter joint between the two members.

2. Description of the Prior Art

In prior art fenestration products such as doors and windows, an open, rectangular metal clad frame is often secured to the outer edge of a box-like, rectangular, wooden framework. The clad frame consists of four separate extruded members that intersect one another at right angles to form the open rectangle. At each corner of the rectangle, the ends of the members are complementally beveled to produce a miter joint. An internal, generally L-shaped, plastic body spans the joint and is fastened to the two members to hold the corner together. The two oppositely projecting legs of each body complementally fit into the somewhat tubular open ends of the extruded members.

In the prior art the right angle legs of the body intersect one another at a diagonally extending, central channel that extends along the back, top, and front of the body. This channel directly underlies and registers with the miter interface line between the two abutting ends of the members at the corner and may be injected with sealant for the purpose of providing an environmental seal under the interface line.

Because of its location in direct registration with the interface line, the channel of the prior art corner lock sometimes allows sealant to escape through the interface line and onto a decorative exterior surface of the product, detracting from its aesthetic appeal. This requires extra material to compensate for the escaped sealant and extra labor to clean the sealant from the decorative surface, leading to higher manufacturing costs.

SUMMARY OF THE INVENTION

The present invention solves the problems mentioned above and provides a distinct advance in the state of the art. In particular, the corner lock hereof not only serves the primary function of tightly holding together the metal cladding members at the corner, but also provides a way of achieving a secure environmental seal without allowing sealant to escape through the miter interface line onto the decorative surface of the cladding. In addition, the lock is configured to cooperate with the cladding members during factory assembly to provide a small outlet through which sealant being injected can also flow back out onto the non-decorative surface of the glazing flange of the cladding to form an exterior, diagonal sealing bead along the miter interface line at that location.

The preferred corner lock comprises a generally L-shaped body of resinous material having a pair of intersecting, symmetrical legs with a junction therebetween. The legs are configured for snug reception in the open ends of respective adjacent frame members. The legs are designed to position the junction in direct underlying registration with the miter interface line when the frame members are coupled together by the corner lock. Instead of a single, central channel directly underlying the interface line, the lock has a pair of parallel sealant receiving channels offset from the interface line on opposite lateral sides thereof. When the two channels fill with sealant, they thus define two separate, parallel lines of seal that are spaced away from the interface line a sufficient distance as to keep sealant from reaching the interface line and escaping therethrough. The two lines of seal at each corner prevent any outside moisture that enters the interface line from traveling past the sealant channels and into the interiors of the frame members. A pair of resilient deflection ribs positioned between respective sealing channels and the interface line are configured to engage the interior surface of the corresponding frame members and thereby keep sealant from overflowing the channels and reaching the interface line.

On the back of the body, corresponding to the "convex" outside angle of the corner, the two sealing channels intersect at a centrally disposed void located near the bottom edge of the body. When the frame is assembled at the factory, sealant is injected into the void through a filling hole in the frame, and the sealant then flows into the two sealing channels to fill those regions. On the front of the body, the two sealing channels intersect at a centrally disposed cavity near the bottom edge of the body. Thus, during manufacture, injected sealant flows from the void into the two channels, through and along the channels from the back to the front, and then into the cavity on the front so as to seal off the open ends of the frame members at those locations and prevent the ingress of moisture.

The frame includes a flat, inwardly projecting glazing flange that is overlapped by the outer margin of a pane of glass or the like laid onto the non-decorative surface of the glazing flange. The area of overlap provides a marginal interior mounting surface for the pane. A bead of sealant along the entire rectangular trace of overlap securely attaches the pane to the frame and prevents moisture from entering under the pane.

One end of each member of the frame has a small notch in an upstanding, interior wall of the member near the miter joint that communicates the cavity at the front of the body with the non-decorative surface of the glazing flange. Therefore, when sealant is injected into a corner of the frame to fill the rear void, sealing channels, and front cavity, some of the sealant is forced out through the notch and onto the non-decorative surface of the glazing flange along the miter interface line. This "tail" of sealant can be manually spread along the length of the interface line on the non-decorative surface of the glazing flange before the bead of sealant for the window pane or other panel is then applied, thereby assuring that the pane is fully sealed along the miter.

Each deflection rib is yieldably resilient, allowing the corner lock to fit intimately into the frame members, compensating for variations in the frame members. Any amount of sealant which might escape past the ribs is minimal to the point of not leaking out the decorative side of the joint.

BRIEF DESCRIPTION OF THE DRAWINGS

FIG. 7 is a fragmentary pictorial view of the bottom of the frame assembly with portions broken away to reveal details of construction;

FIG. 8 is a fragmentary pictorial view of the bottom of the frame assembly similar to FIG. 7 but without parts broken away whereby to show the small outlet notch in one frame member through which injected sealant may flow out onto the non-cosmetic surface of the glazing flange into covering relationship with the miter joint;

DETAILED DESCRIPTION OF THE PREFERRED EMBODIMENT

Figure 1:
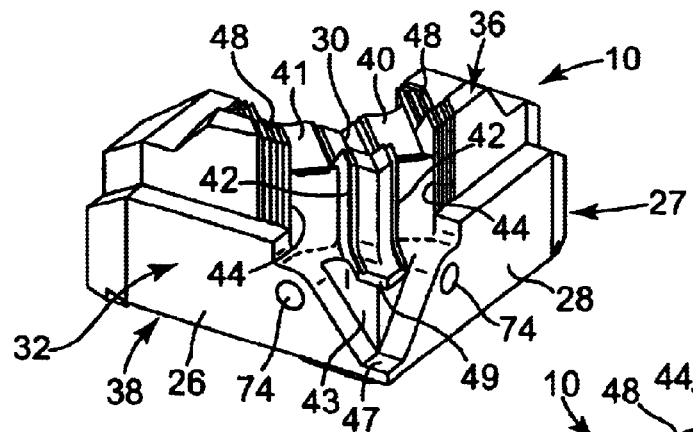
FIG. 1 is a pictorial view of the back and top of the preferred corner lock in accordance with the present invention.
Figure 2:
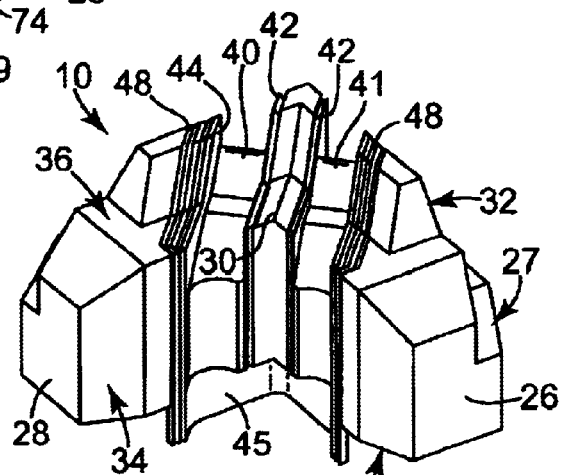
FIG. 2 is a pictorial view of the front and top of the corner lock of FIG. 1.

The drawing figures illustrate preferred corner lock 10 holding together the corner of a rectangular metal cladding frame 12 of a fenestration product in accordance with the present invention. The cladding frame 12 is attached to the outer edge of a wooden, box-like framework 13 shown only fragmentarily in the figures. (See FIGS. 11 and 12) Four of the corner locks 10 are used with each frame 12, one at each corner. The frame 12 includes extruded metal members 14 and 16 that intersect one another at right angles to form the corner. Sealant 18 may be injected at each corner to provide an environmental seal. The cladding frame and wooden framework surround a panel 96 (FIGS. 11 and 12) that may comprise a pane of glass, a plate, or any other similar structure.

Each extruded frame member 14, 16 is somewhat tubular, presenting a pair of opposite open ends 20. Members 14, 16 intersect one another at right angles; however, ends 20 are mitered such that members 14, 16 abuttingly engage one another in a miter joint that presents a diagonal miter interface line 24 along the decorative outer surface 25 of the frame.

Corner lock 10 comprises a generally L-shaped body 27 integrally molded from synthetic resin material and presenting a pair of legs 26 and 28. Leg 26 fits complementally into the open end 20 of member 14 and the other leg 28 fits complementally into the opposing open end 20 of member 16. A diagonally extending junction line 30 is formed at the intersection of the two legs 26 and 28. When the body 27 is installed within the frame, the junction line 30 is disposed directly below and in registration with miter interface line 24.

The body 27 includes a generally "convex" back 32, a generally "concave" front 34, a top 36, and a bottom 38. A pair of parallel, sealant-receiving channels 40 and 41 are disposed in mutually laterally spaced relationship on opposite sides of the junction line 30 so as to each be laterally offset from the junction line 30. Channels 40 and 41 begin at an inverted, triangular, common void 43 on the back 32, extend up and over the top 36, and run down the front 34, terminating at a common cavity 45 near the front lower extremity of the body. The lower end of the cavity 45 is open, but the lower end of the void 43 is closed (by a pad 47, FIG. 1). A ledge 49 on the back 32 overhangs the void 43 and causes sealant injected into the void 43 through an injection hole 51 in the member 14 (FIG. 6) to split into two paths of travel and enter the channels 40 and 41.

Each sealing channel 40,41 is generally transversely U-shaped, being bounded along one side by an upstanding deflection rib 42 adjacent the junction line 30 and along the opposite side by a sealing wall 44 defined by a plurality of upstanding flanges 48. A transversely concave floor interconnects the sealing wall 44 and the deflection rib 42.

The deflection rib 42 is configured to engage the interior surface of the corresponding frame member 14 or 16 and to prevent a substantial amount of sealant 18 from escaping laterally out of the corresponding sealing channel 40 or 41. Deflection rib 42 is also resilient, thus compensating for variations in the frame members. Each flange 48 is resilient and engages its corresponding frame member 14, compensating for variations in frame members.

Figure 3:
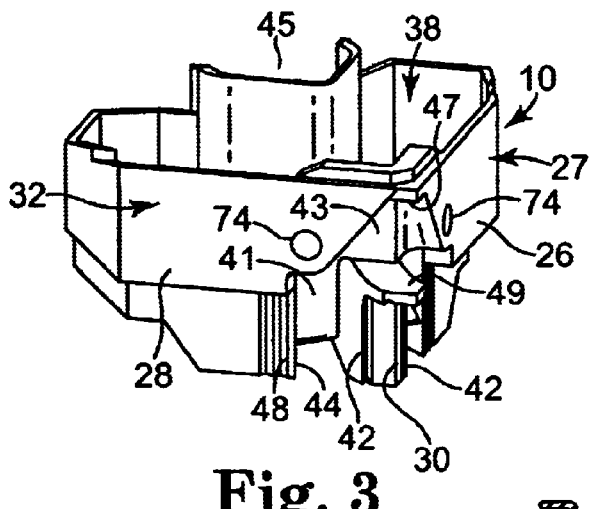
FIG. 3 is a pictorial view of the back and bottom of the corner lock of FIG. 1.
Figure 4:
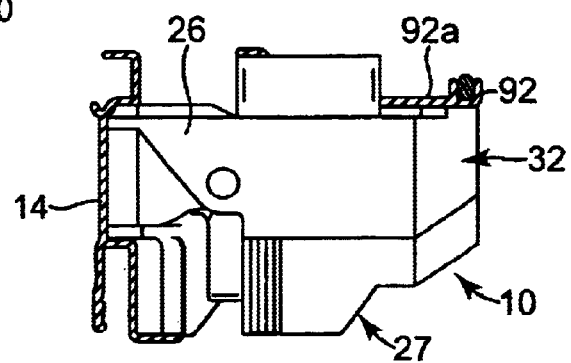
FIG. 4 is a fragmentary transverse cross-sectional view of the corner lock and frame member assembly.
Figures 5, 6:
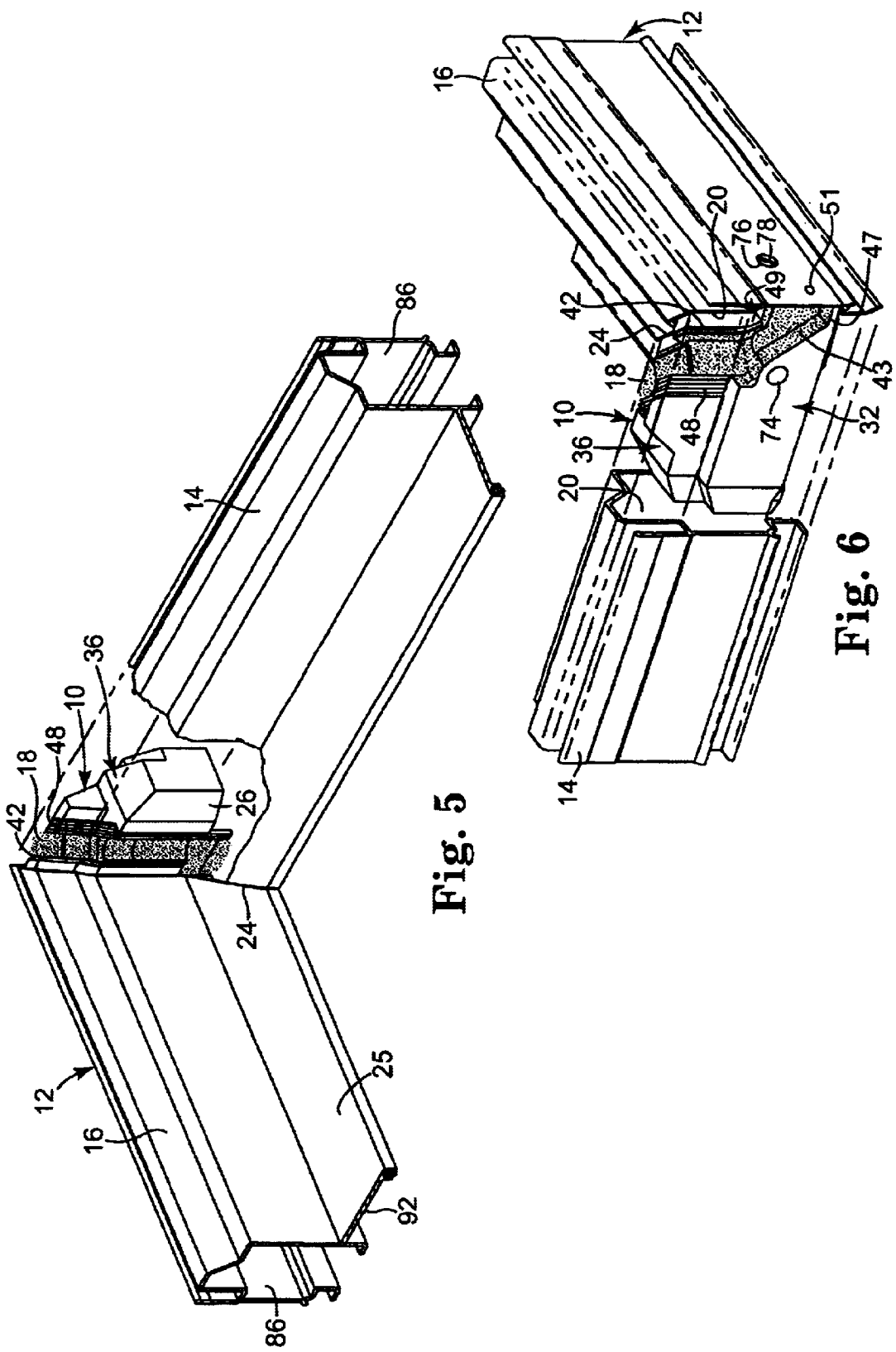
FIG. 5 is a fragmentary pictorial view of an inside corner area of an assembled metal frame with a portion of one frame member broken away for clarity of illustration and showing sealant in the corner lock sealing channels.
FIG. 6 is a pictorial view of an outside corner area of the assembled frame with portions cut away for clarity of illustration and showing sealant on the back of the corner lock.

As shown in FIGS. 1 and 3, each leg 26,28 has a fastener hole 74 in registration with a corresponding fastener hole 76 in frame member 14 or 16. As illustrated in FIG. 6, fasteners 78 are inserted into holes 74 and 76 to secure the corner lock 10 to the members.

Figure 12:
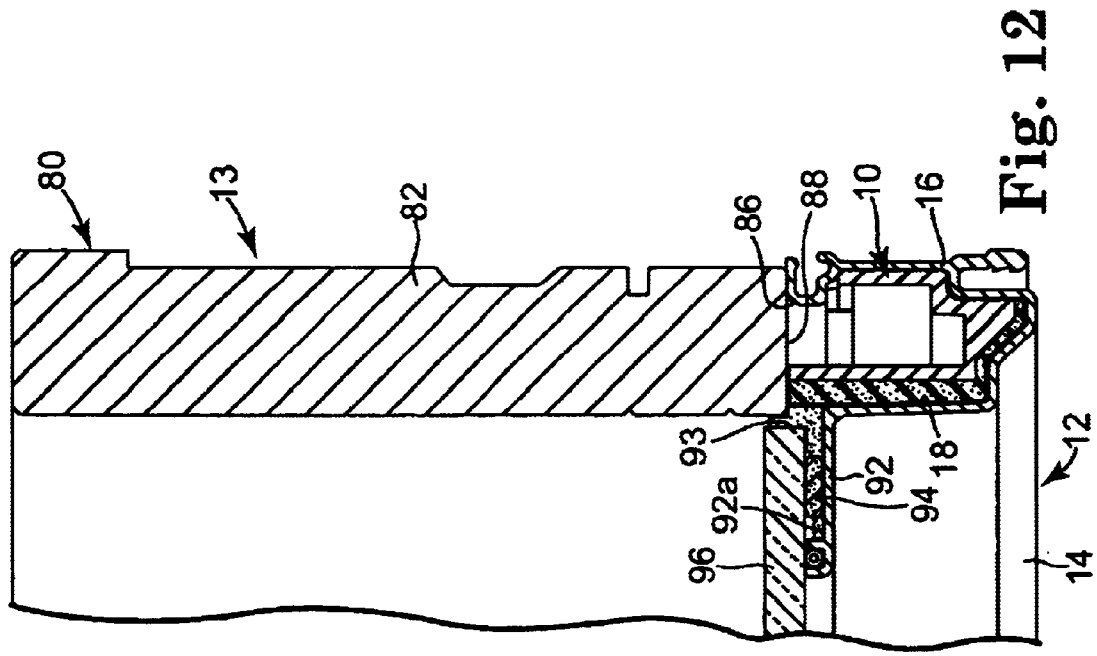
FIG. 12 is a fragmentary, transverse cross-sectional of the assembled product similar to FIG. 11 but taken generally along line 12—12 of FIG. 10.
Figure 11:
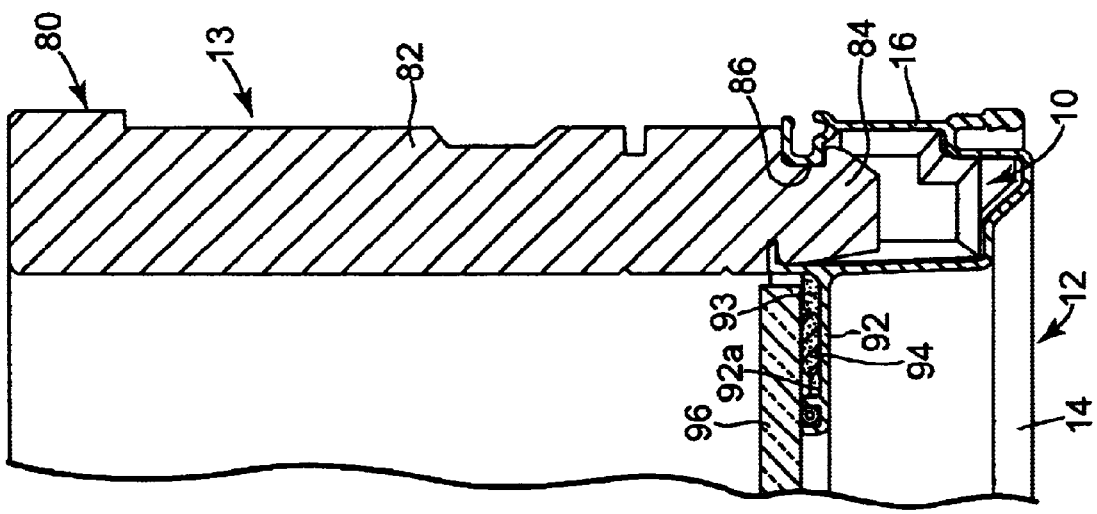
FIG. 11 is a slightly enlarged, fragmentary, transverse cross-sectional view of part of the completely assembled fenestration product, taken generally along line 11—11 of FIG. 10 of the partially assembled product.

In the manufacture of the fenestration product, illustrated by way of example as a window in FIGS. 11 and 12, a wooden frame piece 80 corresponding in length to each metal frame member is first assembled to the member. Each piece has a main body portion 82 and a tongue 84 that is fitted into a receiving slot 86 defined along the length of the frame member by the generally U-shaped profile of the member. The tongue 84 is shorter than the main body portion 82 and is centered along the length of the piece 80 so that a cutout 88 is defined at each end of the piece where there is no tongue. As illustrated in FIGS. 11 and 12, the tongue 84 overlies the empty portion of the interior of the metal frame member while the cutout 88 overlies the corresponding leg of the body 27 when the product is fully assembled.

After all four of the metal frame members have received their wooden frame pieces 80, four of the corner locks 10 are inserted into appropriate open ends of the four frame members to join them together in an open rectangle. One leg 26 of each lock 10 fits into the open end 20 of a member 14, while the other leg 28 fits into the open end of the adjoining member 16. This positions the mitered ends 20 of adjacent frame members 14, 16 in mated engagement with one another, forming the miter interface line 24 therebetween at each corner. Next, the wooden pieces are secured together at their ends with staples or the like to form a sturdy wooden framework, and fasteners 78 are inserted into frame holes 76 and screwed into body holes 74.

Sealant 18 is then injected under pressure into each corner through injection hole 51. As sealant fills the void 43, overhanging ledge 49 keeps sealant from moving up the center of the body and instead causes it to split into two separate flow paths and enter the channels 40 and 41. Once in the channels 40 and 41, the sealant continues up the back 32 of the body, over the top 36, and down the front 34 to the cavity 45. Two parallel lines of seal, both laterally offset from the miter interface line 24, thus become formed at the corner to close off the interiors of their respective frame members from moisture that might enter the interface line 24.

As illustrated in FIG. 8, the inboard sidewall 16*a* of the metal frame member 16 has a small notch 90 immediately adjacent the interface line 24. The top of the notch 90 is covered and thus closed off by overhanging body portion 82. However, the front of the notch 90 is open to and communicates with the cavity 45 on the lower front of the body 27. Therefore, as the sealant 18 is injected under pressure into the void 43, channels 40, 41, and cavity 45, the leading end of the sealant flow emanates from the notch 90 and forms a "tail" on the non-decorative surface 92*a* of the glazing flange 92 of the member 16. The sealant "tail" from notch 90 can then be manually spread along and over the interface line 24 as a diagonal sealant strip 93 at that location.

Figure 10:
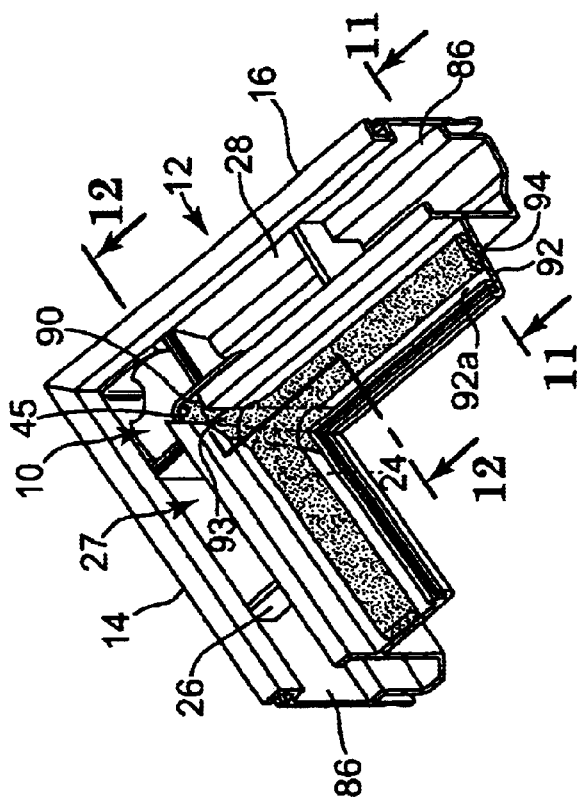
FIG. 10 is a further fragmentary pictorial view of the bottom of the frame assembly after the sealant "tail" from inside the corner has been spread along the miter interface line and a continuous sealant bead has been laid on the non-decorative surface of the glazing flange all around the frame.
Figure 9:
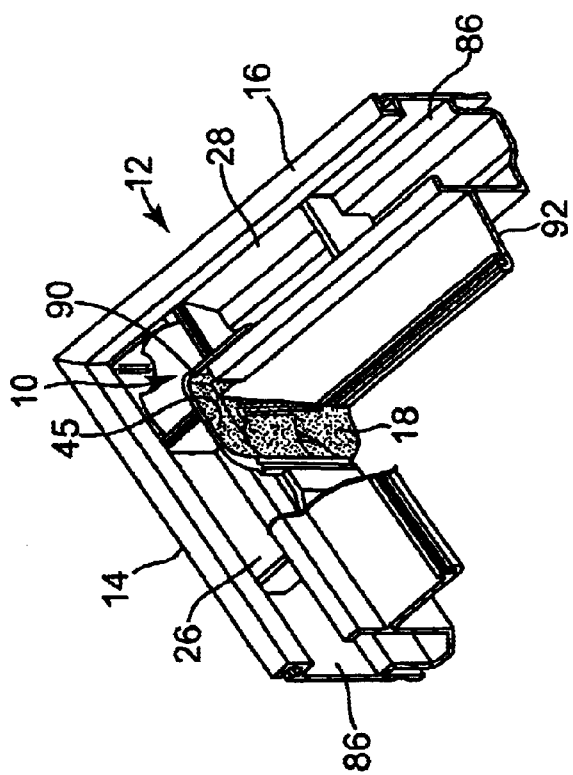
FIG. 9 is another fragmentary pictorial view of the bottom of the frame assembly with one of the members broken away to reveal sealant inside the corner at the front of the lock.

After all four corners have been sealed, a final continuous, bead 94 of sealant (FIGS. 10, 11, and 12) is laid on the non-decorative surface 92*a* completely around the frame 12, overlying the diagonal sealant strips 93. Thereafter, as shown in FIGS. 11 and 12, a panel of desired material, such as a pane of glass 96, is placed within the frame 12 with its marginal edges overlying the glazing flanges 92 and the sealant bead 94. This keeps moisture on the exterior side of the glass 96 from passing to the interior side thereof along its edges and corners.

The corner lock of the present invention thus provides a way of securely holding mitered corner pieces together while also promoting a good seal against the elements. Furthermore, it saves labor and promotes a neat, clean appearance on the decorative side of the fenestration product by preventing the escape of sealant through the miter interface line during assembly of the product.

Those skilled in the art will appreciate that the present invention encompasses many variations in the preferred embodiment described herein. For example, the corner lock 10 is described as integrally formed from synthetic resins, but could be manufactured in several pieces and joined together or could be manufactured from other types of materials such as wood or metal such as aluminum.

Having thus described the preferred embodiment, the following is claimed as new and desired to be secured by Letters Patent:

We claim:

1. A corner lock for coupling adjacent frame members of a fenestration product, the adjacent frame members having respective end faces configured to matingly engage one another to form a joint there between, said adjacent frame members presenting respective coupling openings defined in the end faces, said corner lock comprising:
   a first leg configured for reception in the coupling opening of one of the adjacent frame members;
   a second leg configured for reception in the coupling opening of the other of the adjacent frame members; and
   a junction between said first and second legs, said legs being configured to position said junction in registration with the joint of the adjacent frame members when coupled by said corner lock,
   said legs including structure defining respective first and second sealing channels positioned laterally offset from said junction, each channel defining a flow path that extends along opposite sides of said junction from one side of said legs to an opposite side of said legs, with said channels configured for receiving sealant therein to provide a seal between said legs and respective frame members,
   said first leg including an upstanding, first rib positioned between said first sealing channel and said junction,
   said second leg including an upstanding, second rib positioned between said second sealing channel and said junction,
   said first and second ribs configured to minimize the flow of sealant from said channels to said junction and thus to the joint.

2. The corner lock of claim 1, wherein said first and second ribs are configured to engage and compensate for their respective frame members.

3. The corner lock of claim 2, wherein said first and second ribs are yieldably resilient to compensate for frame variations.

4. The corner lock of claim 1, said sealing channels being generally parallel to each other.

5. The corner lock of claim 1, said legs being generally symmetrical about said junction.

6. The corner lock of claim 1, said first leg further including a first upstanding, sealing wall defining one side of said first sealing channel, opposite said first deflection rib, and configured to engage a respective frame member, and said second leg including a second upstanding, sealing wall defining one side of said second sealing channel, opposite said second deflection rib, and configured to engage a respective frame member.

7. The corner lock of claim 6, said first and second sealing walls each comprising a plurality of parallel, outwardly extending flanges configured to maintain sealant in said respective first and second sealant channels.

8. The corner lock of claim 1, said legs being integrally formed of synthetic resin material.

9. The corner lock of claim 1, said legs each having structure defining fastener receiving holes.

10. The corner lock of claim 1, said legs being substantially perpendicular to each other.

11. A fenestration product comprising:
   a plurality of frame members positioned in a surrounding relationship about a panel, having respective end faces with respective coupling openings defined therein, said end faces of adjacent ones of said frame members being matingly engaged to one another forming respective joints there between; and
   a plurality of corner locks coupling adjacent ones of said frame members respectively, each of said corner locks including,
      a first leg received in said coupling opening of one of said adjacent frame members,
      a second leg received in said coupling opening of the other of said adjacent frame members,
      a junction between said first and second legs, said legs positioning said junction in registration with said joint of said adjacent frame members,
      said legs including structure defining respective first and second sealing channels positioned laterally offset from the junction, each channel defining a flow path that extends along opposite sides of said junction from one side of said legs to an opposite side of said legs, with said channels configured for receiving sealant therein to provide a seal between said legs and respective frame members, said first leg including an upstanding, first deflection rib positioned between said first sealing channel and said junction, said second leg including an upstanding, second deflection rib positioned between said second sealing channel and said junction, said first and second ribs configured to minimize the flow of sealant from said channels to said junction and thus to the joint.

12. The fenestration product of claim 11, wherein said first and second ribs are configured to engage their respective frame members.

13. The fenestration product of claim 12, said deflection ribs being yieldably resilient to compensate for frame variations.

14. The fenestration product of claim 11, said sealing channels being generally parallel to each other.

15. The fenestration product of claim 11, said legs being generally symmetrical about said junction.

16. The fenestration product of claim 11, said first leg further including a first upstanding, sealing wall defining one side of said first sealing channel, opposite said first deflection rib, and configured to engage a respective frame member, and said second leg including a second upstanding, sealing wall defining one side of said second sealing channel, opposite said second deflection rib, and configured to engage a respective frame member.

17. The fenestration product of claim 16, said first and second sealing walls each comprising a plurality of parallel, outwardly extending flanges configured to maintain sealant in said respective first and second sealant channels.

18. The fenestration product of claim 11, each of said first and second sealant channels being substantially parallel to said joint.

19. The fenestration product of claim 11, said corner locks having structure defining fastener receiving cavities, said adjacent frame members having structure defining fastener receiving holes corresponding to said fastener receiving cavities, said corner lock and said adjacent frame members being attached by fasteners inserted into said holes and cavities.

20. The fenestration product of claim 11, said legs being substantially perpendicular to each other.

21. A corner lock comprising a generally L-shaped body having a pair of legs intersecting one another at right angles along a diagonal junction line, said body including a front, a back, a top and a bottom, said body having a pair of sealant channels on opposite sides of and laterally offset from said junction line extending generally parallel to the junction line, said sealant channels extending along at least a portion of three of said front, back, top and bottom.

22. A corner lock as claimed in claim 21,
said body being constructed from synthetic resinous material.

23. A corner lock as claimed in claim 21,
said body being integrally formed.

24. A corner lock as claimed in claim 21, wherein the front of said body comprises a cavity therein adjacent the bottom of the body, one end of said channels terminating at said cavity so that the channels direct sealant into the cavity.

25. A corner lock as claimed in claim 24,
the back of said body having a void therein,
the opposite end of said channels terminating at said void for receiving sealant therefrom.

26. A corner lock as claimed in claim 21,
there being an upstanding deflection rib along each of said channels between each channel and the junction line.

27. A corner lock as claimed in claim 26,
each of said deflection ribs being resilient.

28. A corner lock as claimed in claim 21,
there being a upstanding flange along the outboard side of each of said channels remote from the junction line.

29. A corner lock as claimed in claim 28,
each of said upstanding flanges being resilient.

30. A corner lock as claimed in claim 25,
there being an upstanding deflection rib along each of said channels between each channel and the junction line.

31. A corner lock as claimed in claim 30,
there being a upstanding flange along the outboard side of each of said channels remote from the junction line.

32. A corner lock as claimed in claim 31,
said deflection ribs and said flanges being resilient.

33. A corner lock as claimed in claim 32,
said body being constructed from synthetic resinous material.

34. A fenestration product comprising:

an open, rectangular metal frame including members that intersect one another at right angles to form corners of the frame, each of said members being generally transversely U-shaped and having a pair of opposite, mitered, open ends so that the ends of adjacent members at each corner complementally engage one another to present a miter interface line;

a panel mounted on said frame;

a corner lock within each corner of the frame, said lock comprising a generally L-shaped body having a pair of legs intersecting one another at right angles along a diagonal junction line extending generally parallel to the interface line, said body having a front, a back, a top and a bottom and said body having a pair of sealant channels on opposite sides of and laterally offset from said junction line, said sealant channels extending along at least a portion of three of said front, back, top and bottom, said legs projecting into said open ends of the members and being secured thereto, said junction line being disposed in underlying, registered relationship with said interface line; and sealant filling said channels to present a pair of generally parallel seal paths between the lock and the frame that are disposed on opposite side of and laterally offset from said miter interface line.

35. A fenestration product as claimed in claim 34, wherein said channels extend between the front and the back of said body, the front of said body having a cavity therein adjacent the bottom of the body, one end of said channels terminating at said cavity so that the channels direct sealant into the cavity.

36. A fenestration product as claimed in claim 35,
each of said members having an inwardly projecting support flange for the panel, said frame having an outlet notch at each corner communicating the flange with the cavity in the lock whereby sealant may flow from the cavity onto the flange for covering the interface line.

37. A fenestration product as claimed in claim 36,
said outlet notch being in only one of the members at each corner.

38. A fenestration product as claimed in claim 36,
the back of said body having a void therein, the opposite end of said channels terminating at said void for receiving sealant therefrom, said frame having an injection hole at each corner communicating with said void for introducing sealant into the void from outside the frame.

39. A fenestration product as claimed in claim 34, there being an upstanding deflection rib along each of said channels between each channel and the junction line and disposed in engagement with the corresponding frame member.

40. A fenestration product as claimed in claim 39, each of said deflection ribs being resilient.

41. A fenestration product as claimed in claim 34, there being a upstanding flange along the outboard side of each of said channels remote from the junction line and disposed in engagement with the corresponding frame member.

42. A fenestration product as claimed in claim 41, each of said upstanding flanges being resilient.

43. A fenestration product as claimed in claim 38, there being an upstanding deflection rib along each of said channels between each channel and the junction line and disposed in engagement with the corresponding member.

44. A fenestration product as claimed in claim 43, there being a upstanding flange along the outboard side of each of said channels remote from the junction line and disposed in engagement with the corresponding member.

45. A fenestration product as claimed in claim 44, said deflection ribs and said flanges being resilient.

46. A fenestration product as claimed in claim 45, said body being constructed from synthetic resinous material.

47. A fenestration product as claimed in claim 34, said body being constructed from synthetic resinous material.

48. A fenestration product as claimed in claim 34, the legs of said lock being secured to the corresponding members of the frame with fasteners.

49. The corner lock of claim 1, wherein each flow path is substantially parallel to the junction.

50. The corner lock of claim 1, wherein the structure of the legs provides for substantially no flow of sealant to the junction and thus to the joint.

51. The corner lock of claim 1, further comprising a void formed in fluid contact with both the first and second sealing channels, such that sealant introduced into the void flows into the first and second sealing channels.

52. The corner lock of claim 51, further comprising a cavity formed in fluid contact with both the first and second sealing channels, such that sealant flowing along the first and second channels flows into the cavity.

53. A corner lock comprising:

a pair of legs configured to couple adjacent frame members of a fenestration product at a joint; and a center member positioned between the pair of legs to form a sealant flow path that diverts a sealant used to bind the corner lock to the frame members away from the joint so as to minimize sealant flow out through the joint between the frame members.

54. The corner lock of claim 53, wherein the center member comprises a pair of upstanding ribs positioned to straddle the joint and restrain sealant flow to the joint.

55. The corner lock of claim 53, wherein the sealant flow path comprises a pair of sealant flow paths formed on either side of the center member.

56. The corner lock of claim 53, further comprising a plurality of sealing walls configured to define a side of sealant flow path opposite the center member to restrain sealant flow out of the flow paths.

57. The corner lock of claim 53, further comprising a cavity formed in fluid communication with the flow paths such that sealant flowing along the flow paths flows into the cavity.

58. The corner lock of claim 57, further comprising a void formed in fluid communication with the flow paths on a side of the corner lock opposite the cavity, such that sealant introduced into the void flows into and along the flow path and passes into the cavity.

* * * * *